United States Patent [19]
Watson

[11] Patent Number: 5,286,220
[45] Date of Patent: Feb. 15, 1994

[54] ELECTRICAL CABLE CONNECTOR

[75] Inventor: Arthur I. Watson, Bartlesville, Okla.

[73] Assignee: Camco International, Inc., Houston, Tex.

[21] Appl. No.: 793,523

[22] Filed: Nov. 18, 1991

[51] Int. Cl.⁵ .................. H01R 13/40; H01R 13/52
[52] U.S. Cl. ................................ 439/589; 439/276
[58] Field of Search ............ 439/201, 271, 275–279, 439/587–589, 624, 936

[56] References Cited
U.S. PATENT DOCUMENTS

| | | | |
|---|---|---|---|
| 4,128,735 | 12/1978 | Zehren | 174/65 |
| 4,679,875 | 7/1987 | Ramsey | 439/604 |
| 4,854,886 | 8/1989 | Neuroth | 439/276 |
| 4,927,386 | 5/1990 | Neuroth | 439/589 |

*Primary Examiner*—Paula A. Bradley
*Attorney, Agent, or Firm*—Arnold, White & Durkee

[57] ABSTRACT

An electrical cable connector, such as a pothead for a submergible motor, employs a fluid sealing system that provides for passage of electrical conductor members through tubular bodies while preventing passage of fluid therethrough. The fluid sealing system includes semi-rigid elastomeric packing discs and gland discs. Each packing disc has flexible annular lips that seal upon either an internal surface of a tubular body or an external surface of a conductor member extending through the packing disc. Each lip has a tapered surface engaged with a corresponding annular chamfer on a gland disc; the angles or contours of the lip surfaces and the chamfers being mismatched so as to apply a radial compressive force to each lip. A compression disc is urged into engagement with a gland disc by springs surrounding a portion of the compression disc by a nut or retainer ring. Terminal structures at ends of the electrical conductor members include sleeves which are sealed to the insulation of the conductor members to prevent fluid passage within the conductor members.

10 Claims, 5 Drawing Sheets

ELECTRICAL CABLE CONNECTOR

BACKGROUND OF THE INVENTION

1. Field of the Invention

The present invention relates to electrical cable connectors and, more particularly, to electrical cable connectors that include sealing assemblies to prevent leakage of fluids into or from the electrical cable or the electrical device connected thereto.

2. Setting of the Invention

Electrical cable connectors are used to connect an electrical power transmission cable to an electrical device, such as a motor. When such connectors are used in wellbore environments, the prevention of leakage of fluids from within the wellbore into the cable or the motor at the point of connection is extremly important. Fluid leakage into the windings of the motor of an electrical submergible pump (ESP) is one of the primary causes of premature ESP failure. Such failures result in many millions of dollars in lost revenue caused by the wellbores being deactivated for replacement of the defective ESP's, as well as many thousands of dollars in ESP repair or replacement costs. There is a critical need to have an effective sealing system associated with the electrical cable connectors to prevent this leakage of fluids.

Various prior electrical cable connectors are disclosed in U.S. Pat. Nos. 2,382,117; 4,128,735; and 4,679,875, all commonly assigned to the assignee of the present invention. Of interest is an electrical cable connector with a flowable sealing mechanism disclosed in U.S. Pat. No. 4,927,386. In the '386 Patent a sealing plug of substantially uncured flowable, incompressible seal material is disposed in a connector housing. Movable discs exert pressure on the sealing plug so that the flowable material will flow into any otherwise empty spaces between the discs and a cable and the housing.

While the flowable sealing mechanism of the '386 Patent may initially perform adequately in preventing leakage of fluids, experience has shown that at typically encountered wellbore temperatures and conditions, e.g. up to 400 degrees F., 3000 PSI and hydrogen sulfide over many months with temperature cycling caused by on/off operation of ESP Motor, the once uncured and flowable material used will in fact become "cooked" and thereby become cured and nonflowable. Thus, the sealing mechanism disclosed in the '386 Patent will not function as intended and may provide a path for undesired fluid leakage.

There is a need for an electrical cable connector that will prevent fluid leakage in typically encountered wellbore environment.

SUMMARY OF INVENTION

The present invention has been developed to overcome the foregoing deficiencies and meet the above described needs. Specifically, the present invention is an electrical connector with a tubular body having at least one electrical conductor member extending therethrough, and a fluid sealing system for sealing an interior of the tubular body against passage of fluid.

The fluid sealing system comprises at least one elastomeric packing disc, disposed within the tubular body, and having annular lips about an outer periphery thereof and about an opening therein for the conductor member to pass therethrough. At least one gland disc within the tubular body has annular chamfers about an outer periphery thereof and about an opening therein for the conductor member to pass therethrough. A compression mechanism, such as one or more springs, exerts an axial force to the gland disc to compress the packing disc and thereby cause the chamfers on the gland disc to move radially the corresponding and adjacent annular lips on the packing disc to, in turn, force the annular lips into sealing engagement with an internal surface of the tubular body and an external surface of the conductor member.

With the present invention, nonflowable material can be used that will not degrade or change its intended and needed behavior after prolonged exposure to the wellbore environment. Other and further benefits from the use of the present invention will become apparent after reading the following text.

DETAILED DESCRIPTION OF PREFERRED EMBODIMENTS

As described above, the present invention is an electrical cable connector comprising a tubular body having at least one conductor member extending therethrough, and a fluid sealing system for sealing an interior of the tubular body against passage of fluids.

The fluid sealing system includes at least one elastomeric packing disc fitted transversely within the tubular body and having at least one opening for passage of a conductor member therethrough. The packing disc has an annular lip about an outer periphery thereof and an annular lip about the at least one opening therethrough.

At least one gland disc is fitted transversely within the tubular body and is disposed adjacent the at least one packing disc. The at least one gland disc has an opening for passage of the conductor member therethrough. The gland disc has an annular chamfer about an outer periphery thereof and an annular chamfer about the at least one opening therethrough. Further, the chamfers are correlated with the adjacent annular lips to apply a radial force to the annular lips to force the lips into sealing engagement with an internal surface of the tubular body and an external surface of the conductor member in response to axial compression of the packing disc by the gland disc. This compression is caused by the compression devices, such as springs, carried by the tubular body.

Figure 1:
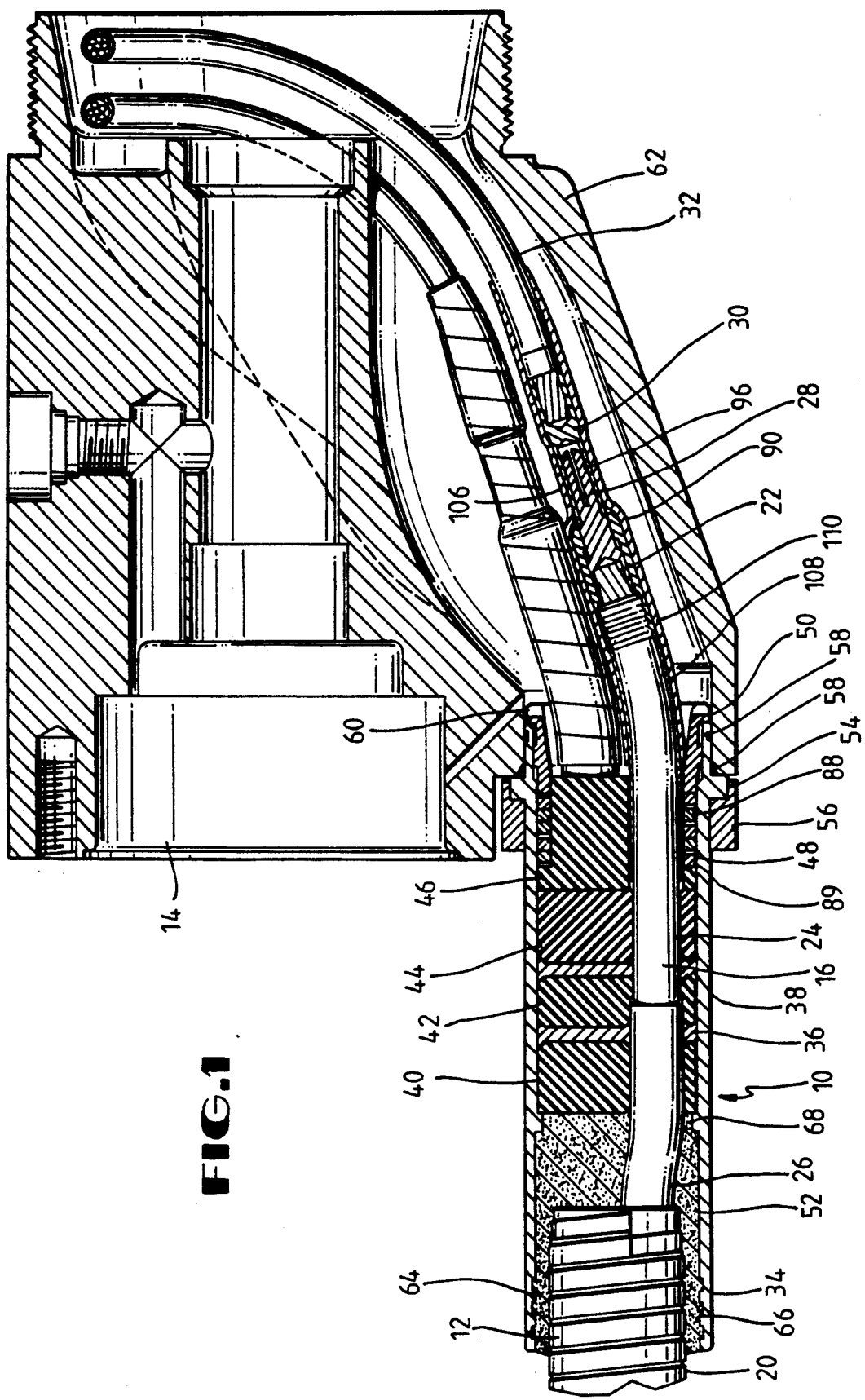
FIG. 1 is a longitudinal sectional view of an electrical connector in the form of a first embodiment of the invention.

As shown in FIG. 1, an electrical cable connector 10 in accordance with one preferred embodiment of the present invention, supplies electrical power from a electrical cable 12 to a submergible motor 14, used as part of an ESP. In the form shown, the cable 12 comprises three wires or conductor members 16 (one of which is shown in FIG. 1) surrounded by a cable jacket 18, in turn surrounded by cable armor 20, as are well known. For example, each comprises a compacted stranded copper conductor 22 integrally surrounded by EPDM (ethylene propylene diene monomer) rubber insulation 24, in turn surrounded by a protective jacket of lead, plastic tape, or extruded plastic 26. The cable jacket 18 can be formed of EPDM rubber and the cable armor 20 from Monel. As shown in FIG. 1, the lead sheath 26 terminates short of an end portion of each conductor member 16, which is provided with a terminal structure 28, for electrical connection to a cooperable terminal structure 30 at an end portion of a corresponding ESP Motor lead 32.

The electrical connector 10 comprises a tubular body 34, such as formed of stainless steel cylinder, having a fluid sealing system of the present invention therein. The fluid sealing system comprises a plurality of semi-rigid, elastomeric packing discs 36 and 38 alternately disposed between a plurality of relatively rigid gland discs 40, 42, 44, a compression disc 46, compression mechanism 48, a gland nut 50, and potting compound 52 into which the cable armor 20, and adjacent portions of the lead sheathed insulated conductor members 16, are embedded.

The tubular body 34 has an annular shoulder 54 engaged by an outer flange 56 that is bolted to an integral or separable flange on the motor head. O-rings 58 provide a fluid seal between an external surface at one end of the tubular body 34 and an internal surface defining an opening 60 in a motor head 62, into which the end of the tubular body 34 is inserted. The opposite end of the tubular body, 34 into which the cable 12 is inserted, has a series of annular internal grooves 64 and ridges 66 which assist in anchoring the potting compound 52 (e.g., of epoxy). An annular internal shoulder 68 of the tubular body abuts the gland disc 40, as will described below.

Figure 2:
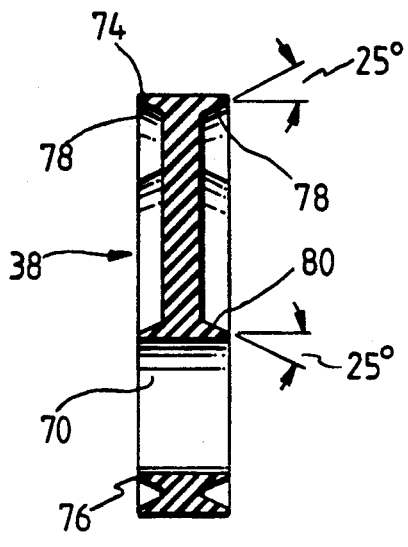
FIG. 2 is longitudinal sectional view, taken along 2—2 of FIG. 3 of a packing disc.
Figure 3:
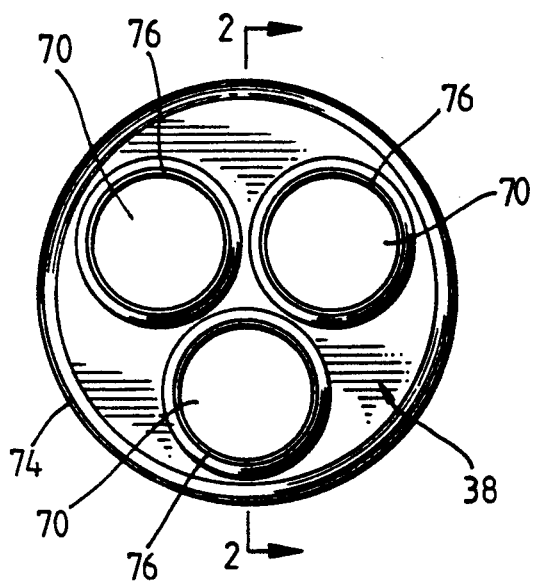
FIG. 3 is a side view of the packing disc of FIG. 2.
Figure 4:
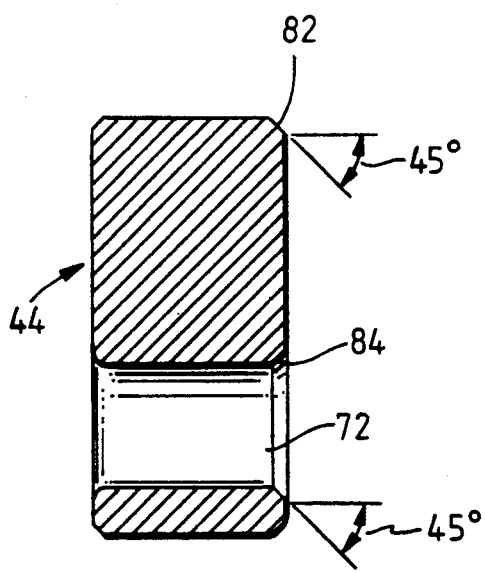
FIG. 4 is a longitudinal sectional view, taken along line 4—4 of FIG. 5 of a gland disc.
Figure 5:
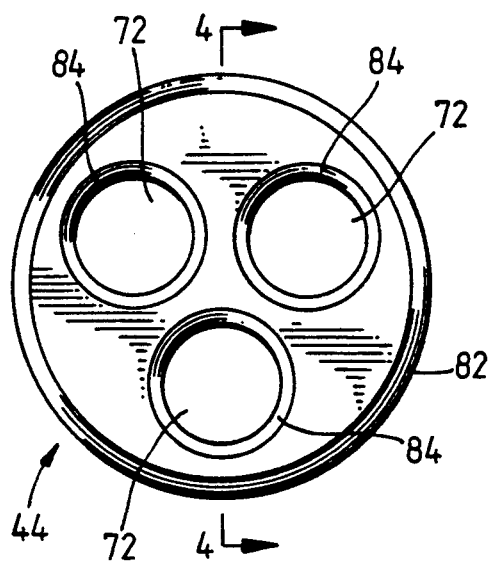
FIG. 5 is a side view of the gland disc of FIG. 4.
Figure 6:
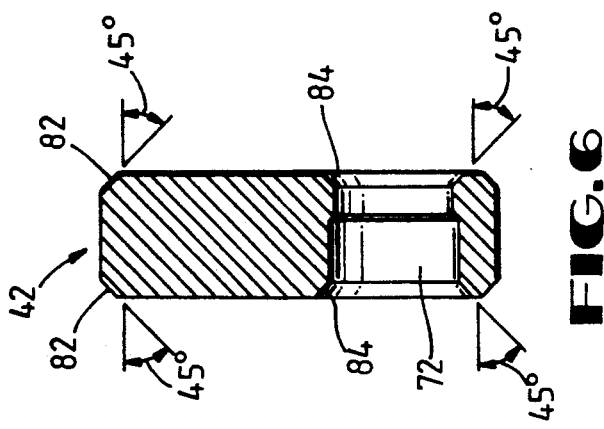
FIG. 6 is a longitudinal sectional view of an alternate embodiment of a gland disc.

The packing discs 36 and 38 can be formed of AFLAS rubber (tetrafluorethylene/propylene polymer.) The packing disc 38 is designed to seal against an internal surface of the tubular body 34 and against an external surface of the insulation 24 of each conductor member 16. The packing disc 36 is designed to seal against an internal surface of the tubular body 34 and against the lead sheath 26 of each conductor member 16. As shown in FIGS. 2 and 3, each packing disc 36 and 38 is slidably fitted transversely within the tubular body 34, and has a hole 70 therethrough for each conductor member 16 to pass therethrough. The gland discs 40, 42 and 44 can be formed of a non-magnetic metal or a high strength plastic, such as of Ryton (polyphenylene sulfide) or PEEK (polyetheratherketone). Each gland disc 40, 42 and 44 has a hole 72 therethrough, aligned with a corresponding hole 70 of the packing discs 36 and 38 for passage of a conductor member 16 therethrough, as shown in FIGS. 4–6.

Each packing disc 36 and 38 is generally planar except for annular lips 74 and 76, one of which, 74, is a peripheral lip disposed to engage an internal surface of the tubular body 34, and others of which, 76, are disposed about corresponding openings 79 to engage external surfaces of respective conductor members 16. Each lip 74 and 76 has a tapered surface 78 or 80 formed about an axis parallel to the length of the tubular body 34. The tapered surfaces 78 and 80 of each annular lip 74 and 76 has an angle, of preferably between about 25 and about 30°, relative to its axis. Alternatively, the tapered surface of the lip may be formed by revolution of a curve about the axis.

Each gland disc 40, 42 or 44 is contiguous with an adjacent packing disc 36 or 38 so that lips are in contact with the chamfers. The gland discs 40 and 44 have a single peripheral chamfer 82 and three chamfers 84 disposed about the three openings 72 for the conductor members 16. The gland disc 42 has a peripheral chamfer 82 at each side thereof and three chamfers 84 disposed on each side thereof about the openings 72 for passage of the conductor members 16. As used herein the word chamfer shall include surfaces formed by revolution of either a sloped line or a curve. The diameters of the openings 72 in the gland discs 40 and 44 fit respective sheathed and non-sheathed portions of conductor members 16. The openings 72 of gland disc 42 are stepped, as shown in FIG. 6, to accommodate variations in the diameter dependent upon presence or absence of a lead sheath 26.

Each chamfer 82 and 84 has a predetermined angle relative to an axis parallel to the length of the tubular body 34, with this angle being preferably about 45°. At any one side of a packing disc or a gland disc, the tapered lip surface or chamfer at the periphery of the disc is angulated oppositely to that formed about an opening for a conductor member. The angles or contours of the chamfers are mismatched with the angles or contours of the tapered surfaces of the lips so as to apply radial force to the lips and to deflect the lips radially, progressively, when the packing discs are compressed between the gland discs.

In the preferred embodiment of the present invention, the angle of the chamfers is greater than the angle of the lips. This relationship is highly effective in attaining the desired sealing engagement between the lips and the surfaces against which the lips are sealed.

The packing discs and gland discs are compressed between the shoulder 68 of the tubular housing and the compression disc 46. The compression disc 46, formed from metal, Ryton, Peek etc., has a substantially planar side adjacent a gland disc 44. A portion of the compression disc 46 is of reduced diameter to provide a cylindrical space between the compression disc 46 and an internal surface of the tubular body 34 into which the compression mechanism 48 is inserted.

Figure 14:
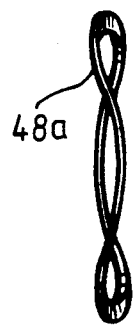
FIGS. 14 and 15 are, respectively, a side view and a plan view of a wave spring.
Figure 16:
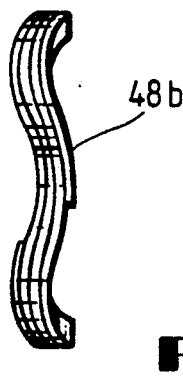
FIG. 16 is a side view of an alternate wave spring.
Figure 15:
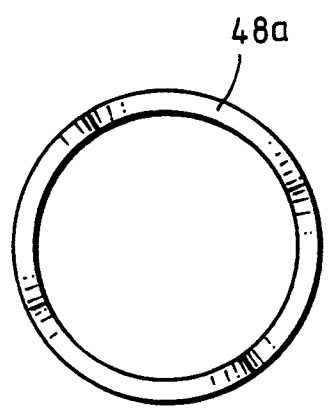

The compression mechanism 48 comprises a plurality of groups of spring elements separated by spacers 88, the spring elements of each group being nested. Each group of spring elements can be constituted by separate wave spring washers 48a, as shown in FIGS. 14 and 15, or by a continuously wound wave spring 48b, as shown in FIG. 16. Nested wave spring elements are in effect in parallel, while stacks of wave spring elements separated by spacers are in effect in series. A continuously wound wave spring can be wound to give the effect of wave washers arranged either in series (peak-to-peak) or in parallel (nested) or both (some turns peak-to-peak, others nested). Since wave springs fit into a smaller annular space than other springs types, wave springs are preferred. By stacking the wave springs between a shoulder 89 of the compression disc 46 and the gland nut 50, predictable quantities of compression and travel (to accommodate expansion, contraction, and swelling) can be provided.

The gland nut 50 is thread into an end of the tubular body 34 until a flange of the gland nut 50 engages an opposing end of the tubular body 34. This movement of the gland nut 50 partially compresses the wave springs 48, which are slidable axially together with the spacers 88, thereby applying a predetermined compressive force, resiliently, from the compression disc 46 to the gland discs and the packing discs.

Because of the mismatch in the configuration of the lips of the packing discs and the chamfers of the gland discs and the chamfers of the gland discs, the planar portion of the gland discs does not come into the face-to-face contact with the planar portion of the packing discs. As the packing discs deform over time, the wave springs maintain the desired compression. The configuration of the lips and the chamfers, the mismatch in the opposing surfaces of the lips and the chamfers, and the flexibility of the lips all contribute to forcing the packing discs to close gaps around adjacent surfaces more efficiently than face-to-face contact, permitting the sealing of wider gaps and rougher surfaces with less compressive force than has heretofore been possible, and without requiring flowable packing material.

Figure 8:
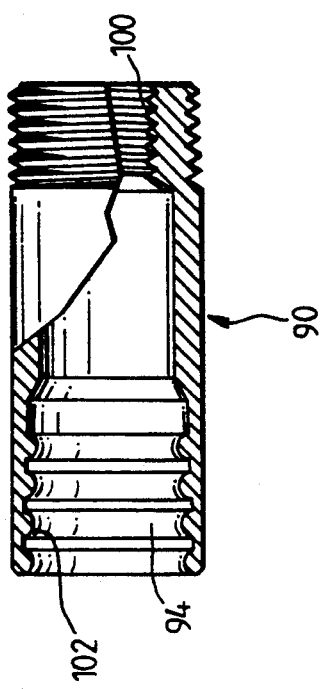
FIG. 8 is a longitudinal sectional view of a terminal sleeve.
Figure 9:
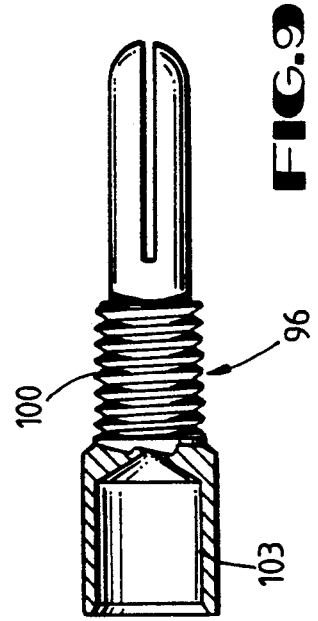
FIG. 9 is a longitudinal sectional view of a terminal element.

Additional protection is provided against fluid leakage into or out of the bore of the insulation of the stranded conductors by the following electrical conductor member 16 interconnection with the motor leads 32. The terminal structure 28 at an end of each conductor member 16 comprises a sleeve 90 or 92 (see FIGS. 8 and 10) having an open end 94 into which an end portion of a conductor member 16 is inserted. The opposite end of the sleeve 90 or 92 has a male terminal element 96 or 98, which can be formed integrally with the sleeve 92 (FIG. 10) or which can be threaded into the sleeve 90 by means of pipe threads 100 provided with a sealant, such as pipe thread compound or Teflon tape (as shown in FIGS. 8 and 9). The sleeve 90 or 92 has a series of annular internal ridges 102, with the internal diameter of successive ridges decreasing in the direction of insertion of the end portion of a conductor member 16. When the end portion of a conductor member 16 is inserted into the open end 94 (mouth) of a sleeve of the terminal structure, at least one of the annular ridges is pressed into fluid sealing engagement with the insulation of the conductor member 16. If any one ridge is so tight as to rupture the insulation, other ridges closer to the mouth of the sleeve and having a larger internal diameter, will effect a seal. Alternatively, the open end 94 can be a tapered socket without ridges which effects a seal against the insulation.

Figure 10:
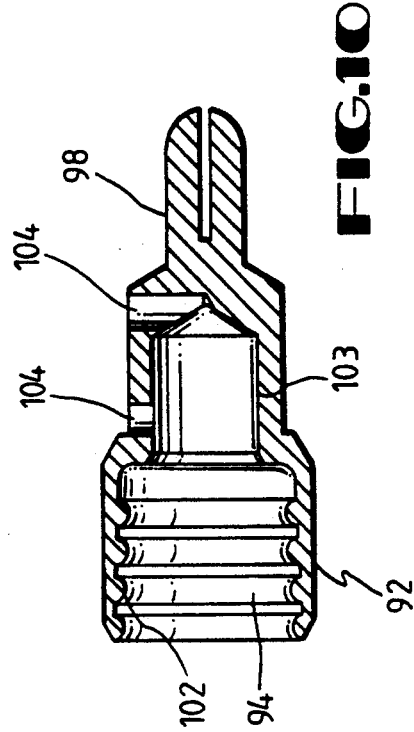
FIG. 10 is a longitudinal sectional view of an integral terminal sleeve and terminal element.
Figure 7:
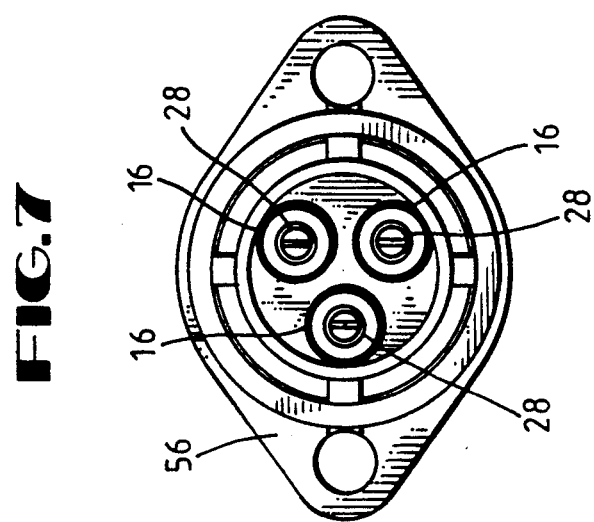
FIG. 7 is a side view of a flange and associated parts.

The conductor 22 of each conductor member 16 can be soldered into a well 103 of the associated terminal structure. In FIG. 10 solder is fed into a hole with another hole serving as a vent. Each sleeve can be held in place with threads, a retaining ring, or a crimp. If threads are used, they also serve to help force the sleeve over the insulation. The tapered pattern of ridges or tapered socket provides optimum sealing force over a variety of insulation diameters and provides tolerance to accommodate swelling.

If an electrical connection is being made between two conductors, both of which must be sealed against leakage into or out of the bore of the insulation or the stranded conductors, double-ended sleeves can be used, with right-hand threads in one end and left-hand threads in the other. The central portion of the sleeve serves as a double-ended female element. Each of the two male terminals features a well 103 and threads 100. One terminal has right-hand threads and the other left-hand threads.

Each terminal is inserted into the proper end of the sleeve. Then, by turning the sleeve in one direction, both terminals are threaded in simultaneously, as in a turnbuckle. This avoids the difficulty of rotating the second conductor, which would be necessary if the sleeve had right-hand threads in both ends.

The terminal element 96 or 98 of each terminal structure 28 attached to a conductor member 16 is engaged with a corresponding terminal element 106 (e.g., female), attached to an end portion of a motor lead 32, as shown in FIG. 1. Shrink tubing 108 (e.g., of FEP Teflon) surrounds the end portion of each conductor member and preferably extends into the corresponding opening of the compression disc 46, gland disc 44, packing disc 38, and into gland disc 42, terminating at the termination of the lead sheath 26. The purpose of the shrink tubing is to reduce friction and grabbing between the several discs and the conductor members, to restrain swelling of the insulation due to oil absorption and embolism, and to augment the electrical insulation. The terminals and the end portions of the conductor members 16 and the motor leads 32 are wrapped with electrical tape 110 (e.g., of Teflon). Engagement of respective terminals 28 and 30 and the tape wrapping are, of course, carried out with the motor leads 32 extended from the motor head 62 before the tubular body 34 is inserted into the motor head.

Figure 11:
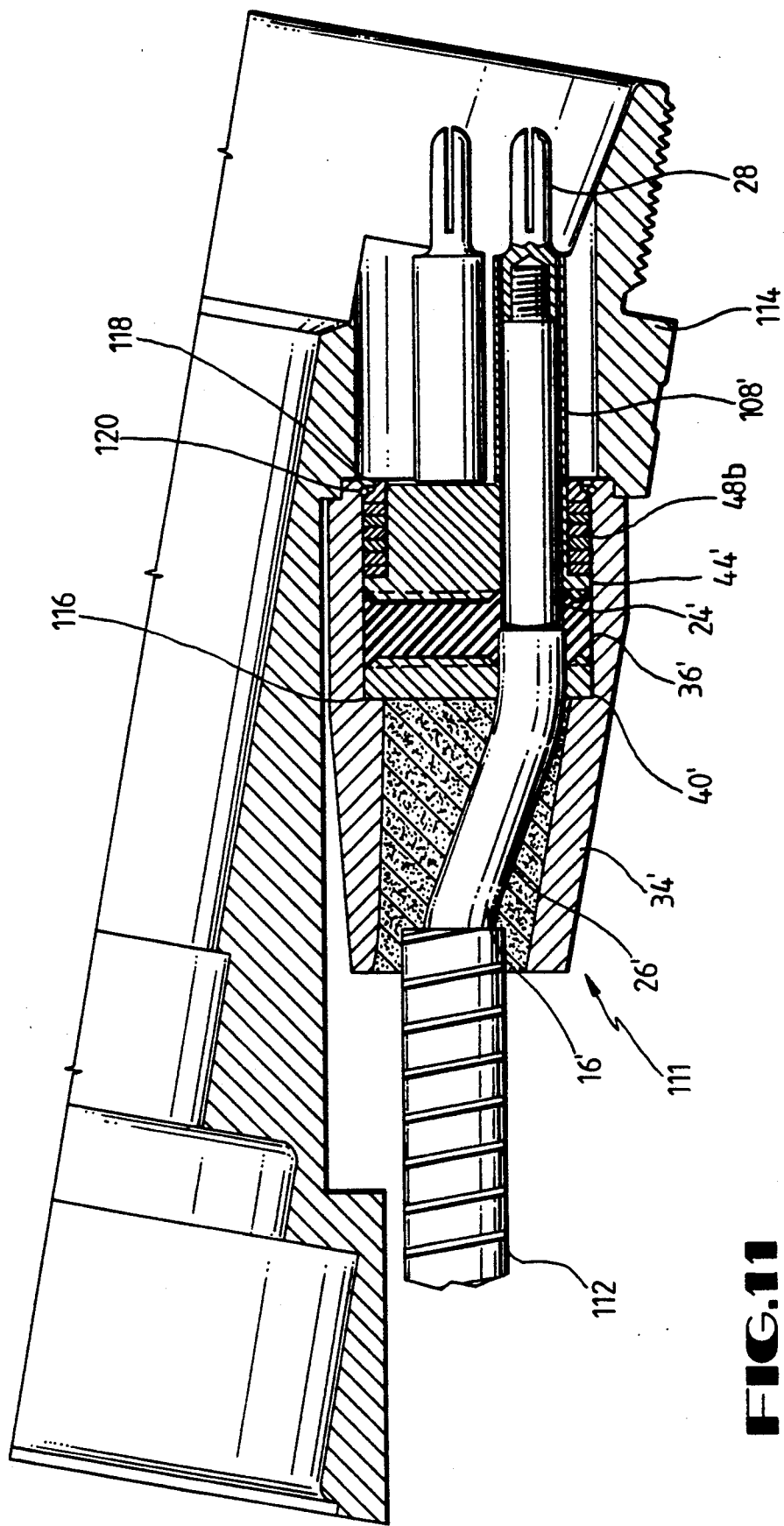
FIG. 11 is a longitudinal sectional view, taken along line 11—11 of FIG. 13, of a second embodiment of the electrical connector.
Figure 12:
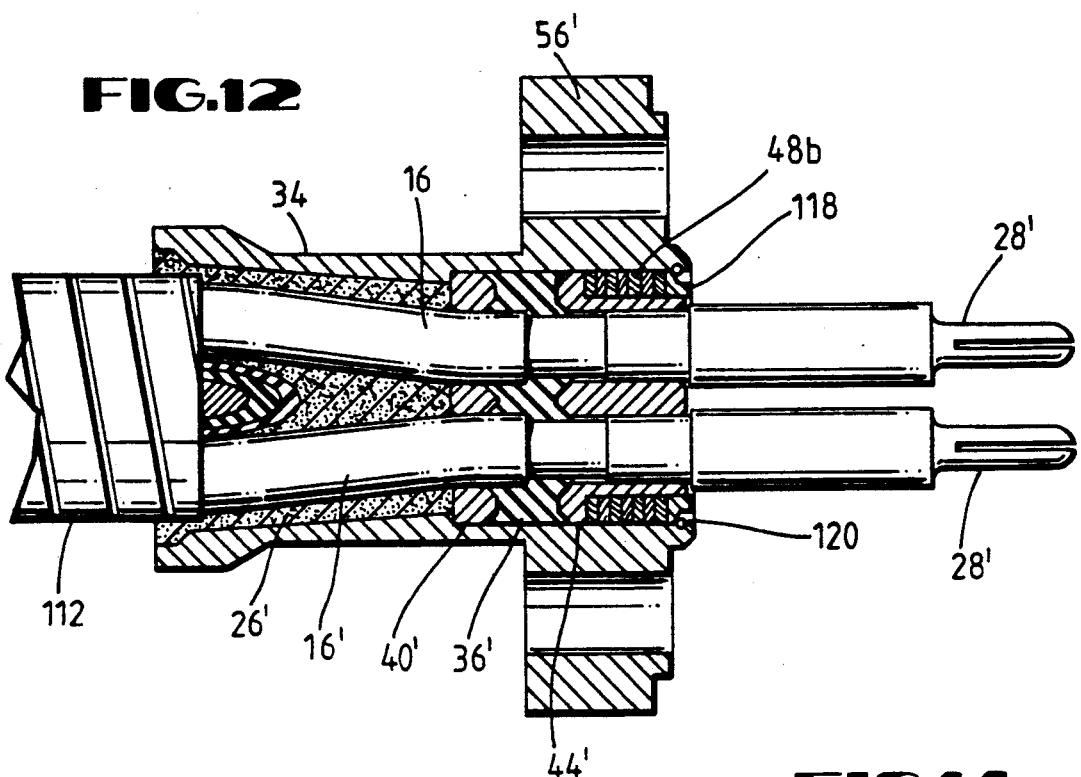
FIG. 12 is a longitudinal sectional view taken along line 12—12 of FIG. 13.
Figure 13:
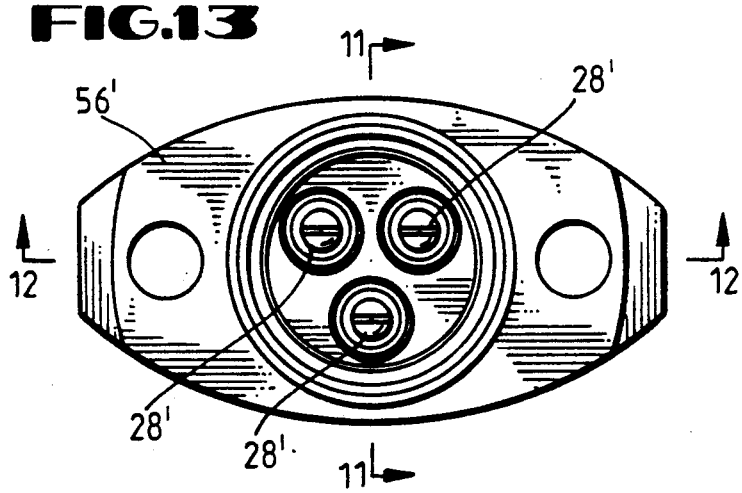
FIG. 13 is a side view showing a flange and associated parts of the embodiment shown in FIG. 11.

FIGS. 11-13 illustrate another embodiment of the invention, which is a connector 111 for electrically connecting a flat cross-section electrical cable 112 to a submergible motor 114. In this embodiment, a single packing disc 36' is employed having stepped openings sized to fit the lead sheath 26' of each conductor member 16' at one side of the packing disc and to fit the insulation 24' of the conductor member at the opposite side of the packing disc. In this embodiment, only two gland discs are employed, one of which, 40', abuts an integral shoulder 116 of a tubular housing 34' having an integral attachment flange 56' (FIGS. 12 and 13), and the other of which, 44', is a combined gland/compression disc. Instead of a gland nut, a spring follower ring 118 applies pressure to nested wave spring elements 48b, the spring follower ring being held in position by a wire snap ring 120 engaged in an internal circumferential groove at one end of the tubular body 34'. The spring follower ring is forced into the tubular body by a suitable pressing tool (not shown), and then the retainer ring is snapped into its groove. Terminal structures 28' and shrink tubing 108' are provided as described earlier.

While the present invention has been described in relation to the attached drawings, it should be understood that other and further modifications, apart from those shown or suggested herein, may be made within the scope and spirit of the present invention.

What is claimed is:

1. An electrical cable connector comprising:
   a tubular body having at least one conductor member extending therethrough, and a fluid sealing system for sealing an interior of the tubular body against passage of fluid;
   at least one elastomeric packing disc fitted transversely within the tubular body and having at least one opening for passage of a conductor member therethrough, the packing disc having a first annular lip about the outer periphery thereof and a second annular lip about the periphery of the at least one opening therein;
   at least one gland disc fitted transversely within the tubular body adjacent the at least one packing disc and having at least one opening for passage of the conductor member therethrough, the gland disc having a first annular chamfer about the outer periphery thereof and a second annular chamfer about the at least one opening therein, said first and second chamfers being correlated with the annular lips on the packing disc so as to apply a radial force to the first and second annular lips to force the first annular lip into sealing engagement with an internal surface of the tubular body and to force the second annular lip into sealing engagement with an external surface of the conductor member in response to axial compression of the packing disc by the gland disc; and
   a compression mechanism carried by the tubular body for urging the gland disc to compress the packing disc.

2. An electrical cable connector of claim 1 wherein the packing disc has an essentially planar side surface juxtaposed with an essentially planar side surface of the gland disc.

3. An electrical cable connector of claim 1 wherein the sealing system comprises a plurality of the packing discs and a plurality of the gland discs alternately disposed within the tubular body.

4. An electrical cable connector of claim 1 wherein the compression mechanism comprises at least one spring for applying a resilient compressive force to the packing discs.

5. An electrical cable connector of claim 1 wherein the conductor member has insulation surrounding a conductor and having a sheath surrounding a portion of the insulation, and the packing disc has one such annular lip on one side disposed to engage the sheath and another such annular lip on an opposite side disposed to engage the insulation.

6. An electrical cable connector comprising:
   a tubular body having at least one conductor member extending therethrough, and a fluid sealing system for sealing an interior of the tubular body against passage of fluid;
   at least one elastomeric packing disc fitted transversely within the tubular body and having at least one opening for passage of a conductor member therethrough, the packing disc having an annular lip each about an outer periphery thereof and about the at least one opening therein;
   at least one gland disc fitted transversely within the tubular body adjacent the at least one packing disc and having an opening for passage of the conductor member therethrough, the gland disc having an annular chamfer each about an outer periphery thereof and about the at least one opening therein, and being correlated with the annular lips on the packing disc so as to apply a radial force to the annular lips to force the lips into sealing engagement with an internal surface of the tubular body and an external surface of the conductor member in response to axial compression of the packing disc by the gland disc; and
   compression means carried by the tubular body for urging the gland disc to compress the packing disc;
   wherein the chamfers have an angle with respect to an axis thereof that is greater than an angle of a tapered surface of the adjacent lips and corresponding with respect to an axis thereof, whereby the lips are deflected radially progressively as the gland disc compresses the packing disc.

7. An electrical cable connector comprising:
   a tubular body having at least one conductor member extending therethrough, and a fluid sealing system for sealing an interior of the tubular body against passage of fluid;
   at least one elastomeric packing disc fitted transversely within the tubular body and having at least one opening for passage of a conductor member therethrough, the packing disc having an annular lip each about an outer periphery thereof and about the at least one opening therein;
   at least one gland disc fitted transversely within the tubular body adjacent the at least one packing disc and having an opening for passage of the conductor member therethrough, the gland disc having an annular chamfer each about an outer periphery thereof and about the at least one opening therein, and being correlated with the annular lips on the packing disc so as to apply a radial force to the annular lips to force the lips into sealing engagement with an internal surface of the tubular body and an external surface of the conductor member in response to axial compression of the packing disc by the gland disc; and
   compression means carried by the tubular body for urging the gland disc to compress the packing disc;
   wherein the compression means comprises spring means for applying a resilient compressive force to the packing discs;
   wherein the compression means further comprises a compression disc within the tubular body, and wherein the spring means comprises a plurality of wave spring elements surrounding a portion of the compression disc between the compression disc and an internal surface of the tubular body, for compression disc having an annular shoulder for receiving a compressive force from the spring means, and the compression means further comprising an annular member for urging the spring means toward the shoulder.

8. An electrical cable connector of claim 7 wherein the wave spring elements are arranged in at least two groups of elements separated by an annular spacer, elements of each group being nested.

9. An electrical cable connector comprising:
   a tubular body having at least one conductor member extending therethrough, and a fluid sealing system for sealing an interior of the tubular body against passage of fluid;
   at least one elastomeric packing disc fitted transversely within the tubular body and having at least one opening for passage of a conductor member therethrough, the packing disc having an annular lip each about an outer periphery thereof and about the at least one opening therein;

at least one gland disc fitted transversely within the tubular body adjacent the at least one packing disc and having at least one opening therethrough for passage of the conductor member through said gland disc, the gland disc having an annular chamfer about the outer periphery thereof and an annular chamfer about the periphery of the at least one opening therein, and being correlated with the annular lips on the packing disc so as to apply a radial force to the annular lips to force the lips into sealing engagement with an internal surface of the tubular body and an external surface of the conductor member in response to axial compression of the packing disc by the gland disc; and compression means carried by the tubular body for urging the gland disc to compress the packing disc; further including a terminal structure which comprises a sleeve into which an end portion of an insulated electrical conductor is inserted, the sleeve having a tapered bore with a series of annular internal ridges disposed to engage the insulation of the conductor member, the diameter of the bore and/or successive ridges decreasing progressively in the direction of insertion of the end portion into the sleeve so that the bore, or at least one of the ridges, seals against the insulation.

10. Apparatus for compressing a sealing element of a packing disc disposed transversely in a tubular body, comprising a compression disc positioned in the tubular body for applying a compressive force to the packing disc, the compression disc having a reduced diameter portion providing an annular space between the reduced diameter portion and an inner surface of the tubular body and having a shoulder at one end of the annular space toward the packing disc, at least one wave spring in the annular space, and means for partially compressing the wave spring against the shoulder.

* * * * *